(12) United States Patent
Michel et al.

(10) Patent No.: US 8,998,229 B2
(45) Date of Patent: Apr. 7, 2015

(54) I-BEAM AXLE SUSPENSION SYSTEM

(76) Inventors: John Michel, Oshawa (CA); Neil Kenneth Haslam, Hamilton (CA); Phillip David Schnurr, Ilderton (CA)

( * ) Notice: Subject to any disclaimer, the term of this patent is extended or adjusted under 35 U.S.C. 154(b) by 0 days.

(21) Appl. No.: 13/601,652

(22) Filed: Aug. 31, 2012

(65) Prior Publication Data

US 2013/0228993 A1 Sep. 5, 2013

Related U.S. Application Data

(60) Provisional application No. 61/529,765, filed on Aug. 31, 2011.

(51) Int. Cl.
*B60G 9/00* (2006.01)
*B60G 5/06* (2006.01)
*B60G 7/00* (2006.01)

(52) U.S. Cl.
CPC .... *B60G 5/06* (2013.01); *B60G 7/001* (2013.01); *B60G 9/003* (2013.01); *B60G 2200/31* (2013.01); *B60G 2204/143* (2013.01); *B60G 2204/4306* (2013.01)

(58) Field of Classification Search
CPC ...... B60G 5/06; B60G 7/001; B60G 2200/31; B60G 2204/143

USPC .......... 280/124.1, 124.11, 124.116, 124.124, 280/124.153, 124.128
See application file for complete search history.

(56) References Cited

U.S. PATENT DOCUMENTS

| | | | | |
|---|---|---|---|---|
| 4,615,539 A | * | 10/1986 | Pierce | 280/124.116 |
| 4,693,486 A | * | 9/1987 | Pierce et al. | 280/80.1 |
| 5,037,126 A | * | 8/1991 | Gottschalk et al. | 280/124.116 |
| 5,116,075 A | * | 5/1992 | Pierce | 280/124.116 |
| 5,375,871 A | * | 12/1994 | Mitchell et al. | 280/124.116 |
| 5,690,353 A | * | 11/1997 | Vandenberg | 280/124.116 |
| 7,347,435 B2 | * | 3/2008 | Chalin | 280/124.116 |
| 7,607,670 B2 | * | 10/2009 | Raidel et al. | 280/124.11 |
| 7,717,442 B2 | * | 5/2010 | Chalin | 280/124.116 |
| 8,002,297 B2 | * | 8/2011 | Keiserman | 280/124.116 |
| 8,292,313 B2 | * | 10/2012 | Pierce et al. | 280/124.11 |
| 2001/0017451 A1 | * | 8/2001 | Smith et al. | 280/124.116 |

* cited by examiner

*Primary Examiner* — Paul N Dickson
*Assistant Examiner* — Robert A Coker
(74) *Attorney, Agent, or Firm* — Daryl W. Schnurr

(57) ABSTRACT

An axle bearing suspension system and method has a pair of elongated beams having an upper section and lower section with T-shaped cross sections. The T-shaped cross sections are welded together to form beams having an I-beam cross section. The beams have attachment portions which are preferably arc shaped cylindrical portions for fixing the beams to the axle with the upper section being welded to an upper part of the axle and the lower section being welded to a lower part of the axle.

15 Claims, 11 Drawing Sheets

I-BEAM AXLE SUSPENSION SYSTEM

Application claims the benefits of application Ser. No. 61/529,765 filed on Aug. 31, 2011.

BACKGROUND OF THE INVENTION

1. Field of the Invention

This invention relates to axle suspension systems for wheeled vehicles and to a method of construction of axle suspension systems. More particularly, this invention relates to an axle suspension system in which the beams are I-beams and the I-beams have an upper section and a lower section, the upper and lower sections being installed on the axle laterally.

2. Description of the Prior Art

Axle suspension systems are known. In one such system described in the Dilling et al U.S. Pat. No. 5,366,237, each beam has a pair of side walls extending in substantially the vertical direction with respect to the vehicle with an orifice in each sidewall through which the axle extends and is rigidly attached thereto. To install the axle suspension system on an axle, the beams must be placed over a free end of the axle and slid longitudinally along the axle to the appropriate location with the axle extending through the orifices in the two sides walls of each beam.

SUMMARY OF THE INVENTION

It is an object of the present invention to provide an axle bearing suspension system in which each beam has an upper section and a lower section that together form an I-Beam when the two sections are installed laterally on an axle.

It is a further object of the present invention to provide an axle bearing suspension system wherein each section of each beam has an attachment portion at an end that is affixed to the axle, the attachment portions of each section corresponding to the cross sectional shape of the axle and being sized to be affixed around the axle with the lower section being substantially on the bottom half of the axle and the upper section being substantially on the upper half of the axle.

An axle bearing suspension system of a leading or trailing beam type for an axle of a wheeled vehicle has a pair of elongated beams. One of the beams is located adjacent to each side of the vehicle and the beams are spaced from one another. The axle extends across an entire width of the vehicle, the axle having at least one wheel located at each end thereof. The axle has a pneumatic bellows located on each of the beams and a hanger bracket located at one end of each beam for connecting the axle to a frame of the vehicle. Each beam has an upper section and a lower section, the upper and lower sections each having a T-shaped cross section. The lower section is inverted relative to the upper section, the upper and lower sections having a corresponding shape to one another to fit together to form an I-Beam when the two sections are installed on an axle. Each section has an attachment portion on an end that is to be affixed to the axle, the attachment portions corresponding to a cross sectional shape of the axle and being sized to be affixed around the axle with the lower section substantially on a bottom half of the axle and the upper section being substantially on an upper half of the axle.

A method of installing an axle bearing suspension system of a leading of trailing beam type for an axle of a wheeled vehicle, the suspension system having a pair of elongated beams, one of the beams being located adjacent to each side of the vehicle and the beams being spaced from one another. The axle extends across an entire width of the vehicle, the axle having at least one wheel located on each end thereof. A pneumatic bellows is located on each of the beams and a hanger bracket is located on one end of each beam for connecting the axle to the frame of the vehicle. Each beam has an upper and lower section, the upper and lower sections each having a T-shaped cross section with an attachment portion on an end that is to be affixed to the axle. The attachment portions have a cross sectional shape corresponding to a cross sectional shape of the axle. The method comprises connecting to the hanger bracket an end of each of the upper and lower sections that is located opposite to the attachment portions to the hanger bracket, positioning the attachment portions at the ends of the upper and lower sections that are to be affixed to the axle around the axle with the lower section being substantially on the bottom half of the axle and the upper section being substantially on an upper half of the axle and affixing the attachment portions to the axle and affixing a lower edge of the upper section and an upper edge of the lower section located between the axle and the hanger bracket to one.

Preferably, the method comprises of fixing the attachment portions to the axle another by one of welding, brazing, soldering and adhesively bonding and affixing the lower section to the upper section by one of welding brazing, soldering and adhesively bonding.

DETAIL DESCRIPTION OF A PREFERRED EMBODIMENT

Figure 1:
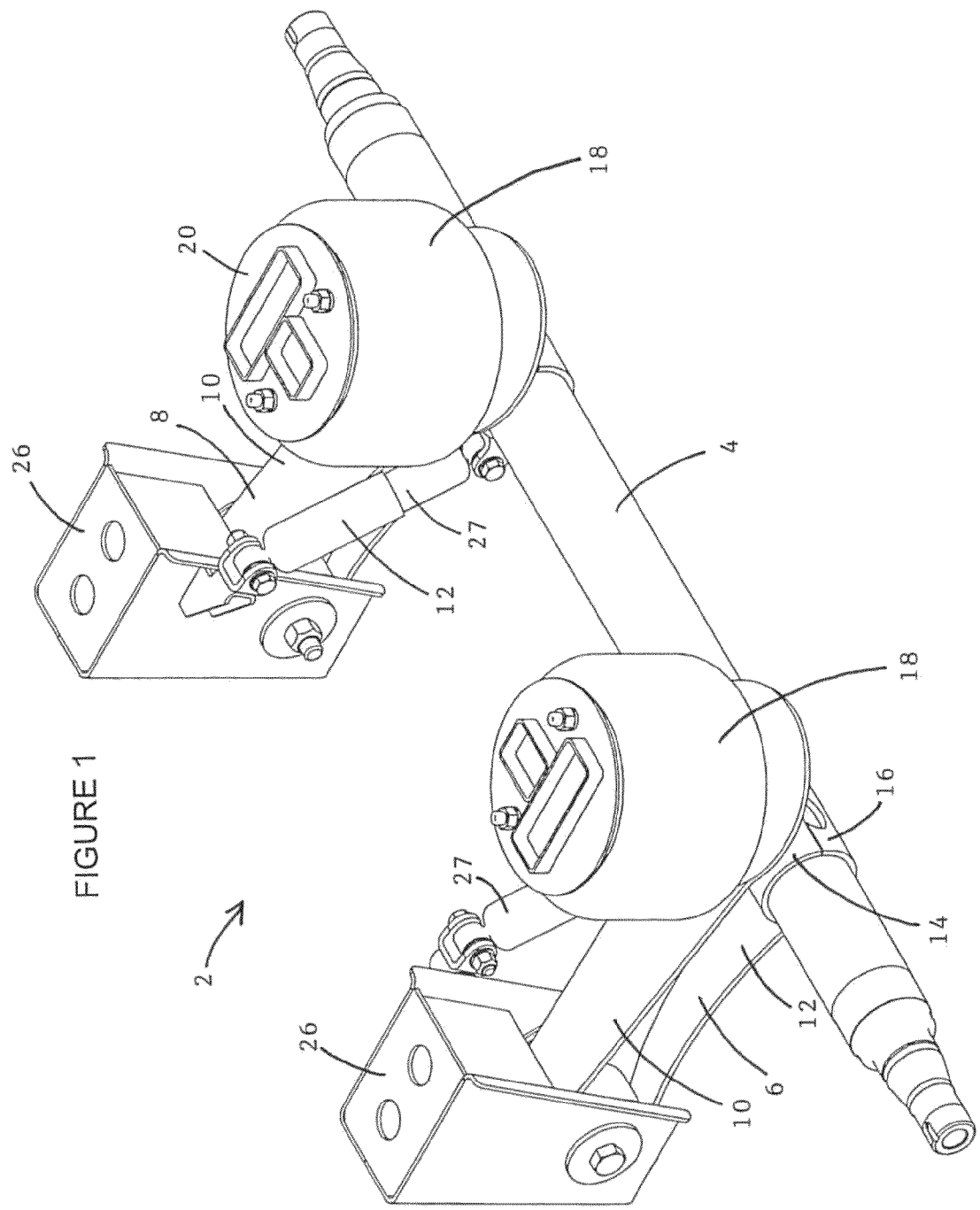
FIG. 1 is a perspective view of an axle suspension system.
Figure 2:
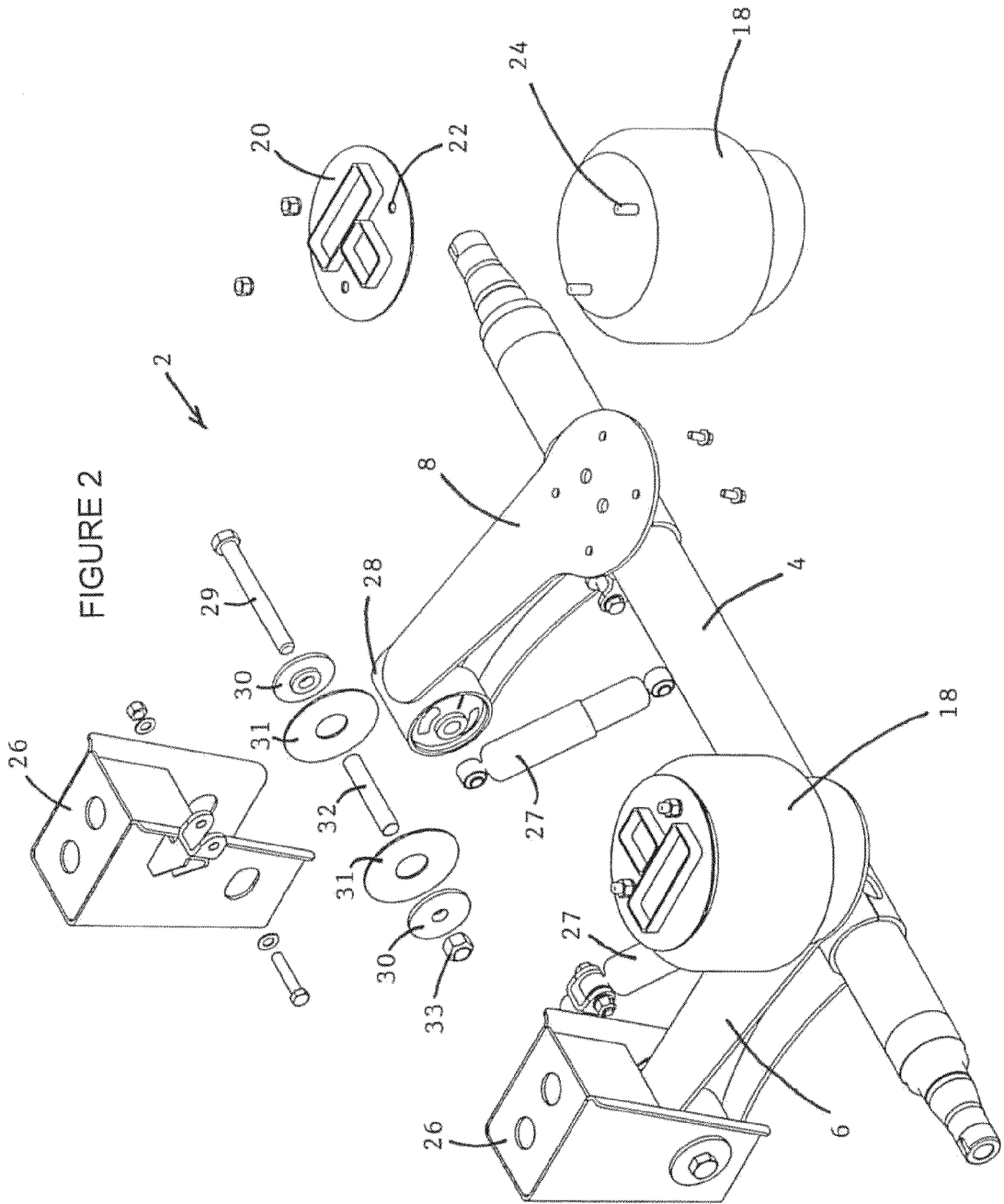
FIG. 2 is a partially exploded perspective view of the axle suspension system of FIG. 1.
Figure 3:
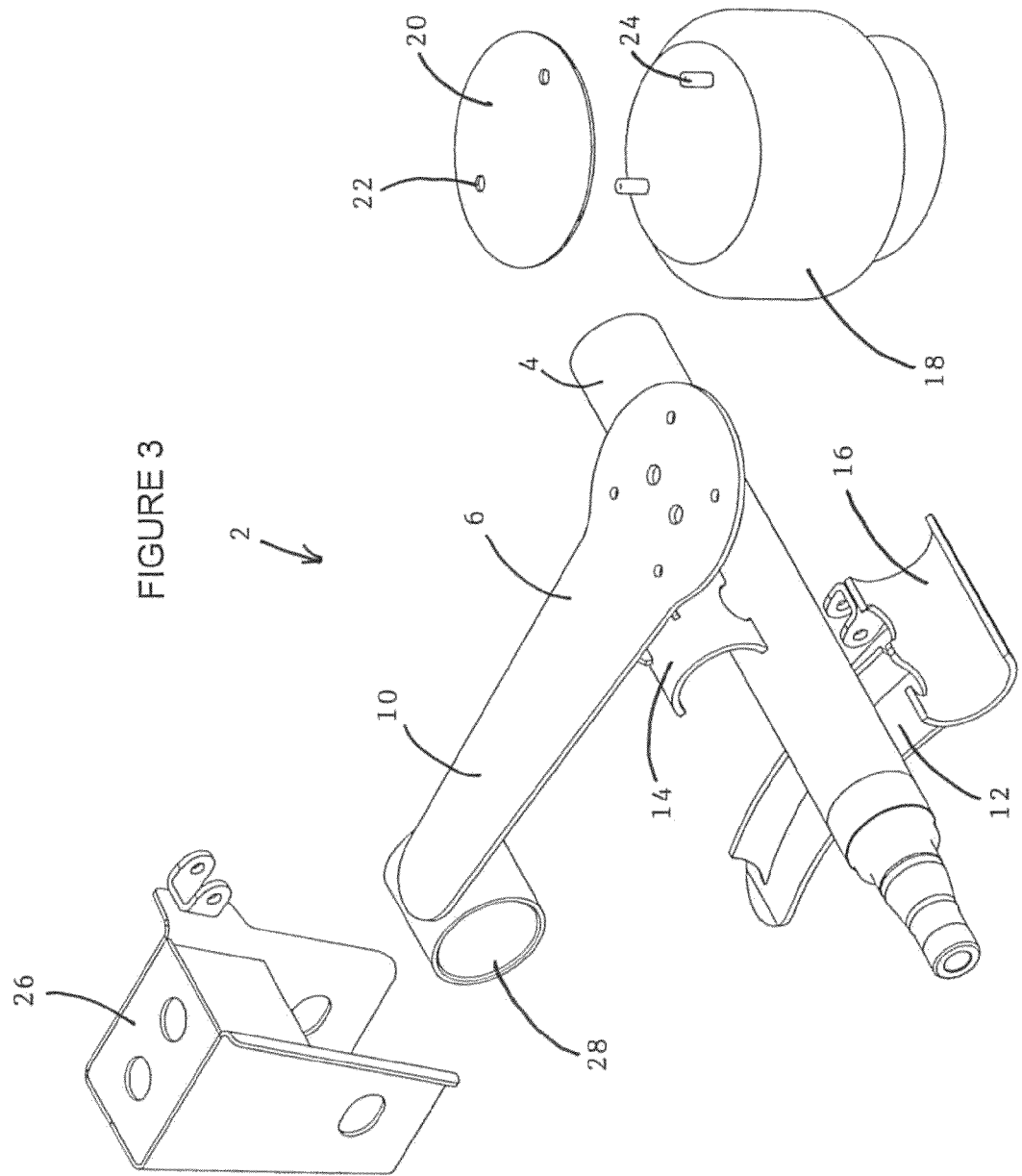
FIG. 3 is an exploded perspective view of part of the axle suspension system of FIG. 1.
Figure 4:
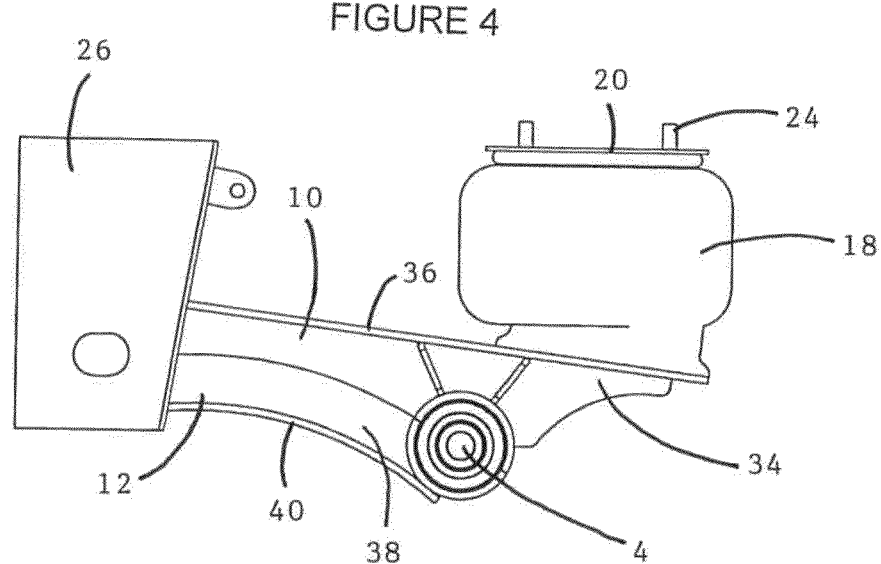
FIG. 4 is a side view of part of the axle suspension system of FIG. 1.
Figure 5:
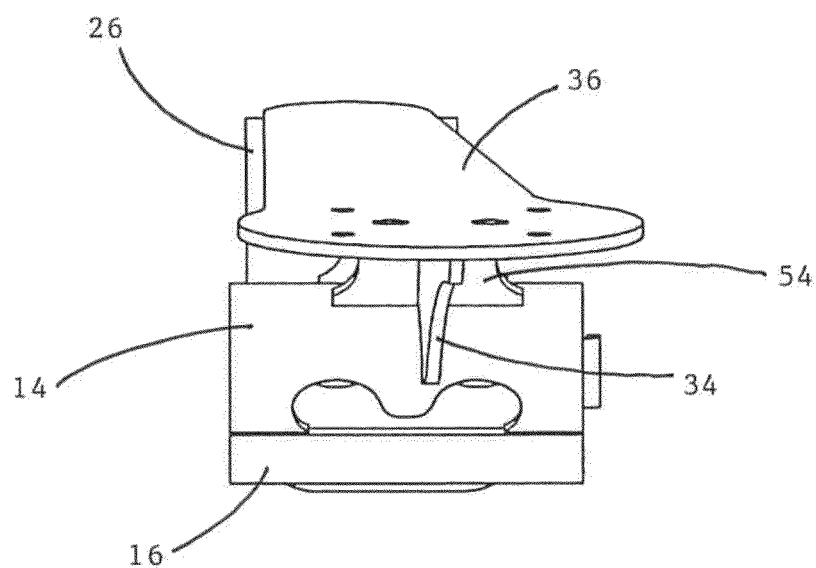
FIG. 5 is an end view of a beam and part of the axle suspension system viewed from an axle end.

In FIGS. 1, 2 and 3, an axle bearing suspension system 2 is used with an axle 4 of a wheeled vehicle (not shown). The suspension system 2 has a pair of elongated beams 6, 8, one of the beams being located adjacent to each side of the vehicle (not shown), the beams being spaced from one another. The axle 4 has a cross sectional configuration and attends across an entire width of the vehicle (not shown). The axle has at least one wheel (not shown) located on each end thereof. Each of the beams 6, 8 each have an upper section 10 and a lower section 12. Each section 10, 12 has a T-shaped cross section, the lower section 12 being inverted relative to the upper section 10. The upper and lower sections 10, 12 respectively have a corresponding shape to one another to fit together to form an I-beam (best seen in FIGS. 9 and 10).

Each section 10, 12 has an attachment portion 14, 16 respectively at an end that is affixed to the axle 4. The attachment portions 14, 16 have a cross sectional shape corresponding to the cross sectional shape of the axle and being sized to be affixed around the axle 4 with the attachment portion 16 of the lower section 12 being substantially on a bottom half of the axle 4 and the attachment portion 14 of the upper section 10 being substantially on an upper half of the axle 4. A pneumatic bellows 18 is located on each of the beams 6, 8. The pneumatic bellows 18 has a plate 20 containing openings 22 that are sized and located to fit over bolts 24 of the bellows 18. A hanger bracket 26 is located on at end of each beam opposite to the bellows 18 for connecting each of the beams to a frame (not shown) of the vehicle (not shown). A pneumatic cylinder 27 extends between the hanger bracket 26 and an axle end of the beams 6, 8.

The beams 6, 8 each have a cylindrical connector 28 for pivotally connecting each beam to one of the hanger brackets 26. The connector 28 is pivotally connected to the hanger bracket by a bolt 29, washers 30, 31, sleeve 32 and nut 33.

In FIGS. 4 to 7, it can be seen that each upper section has a web 34 and a flange 36 and that each lower section 12 has a web 38 and a flange 40.

Figure 6:
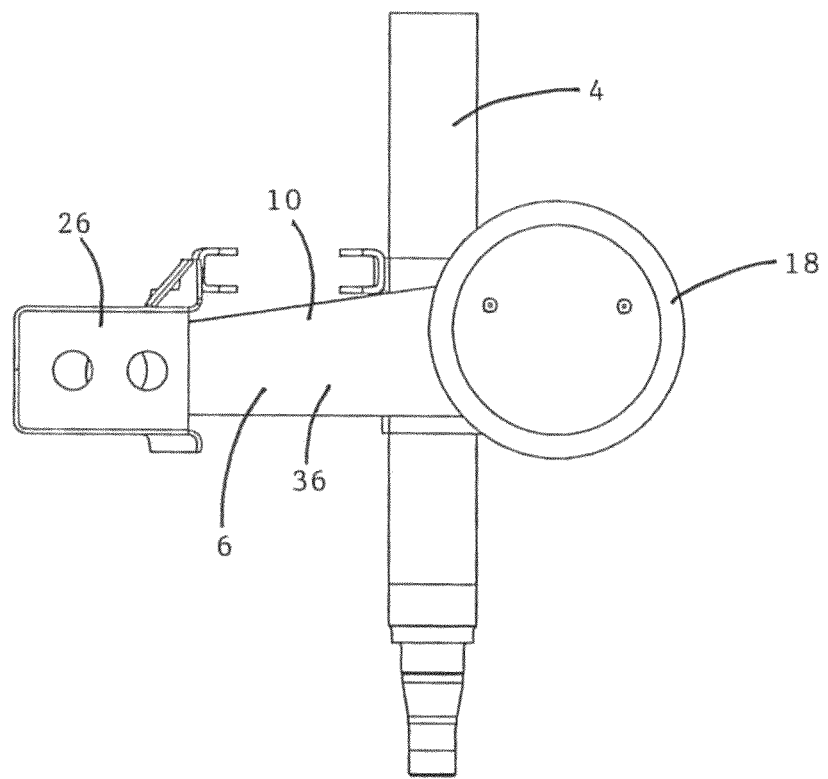
FIG. 6 is a top view of part of the axle suspension system.
Figure 7:
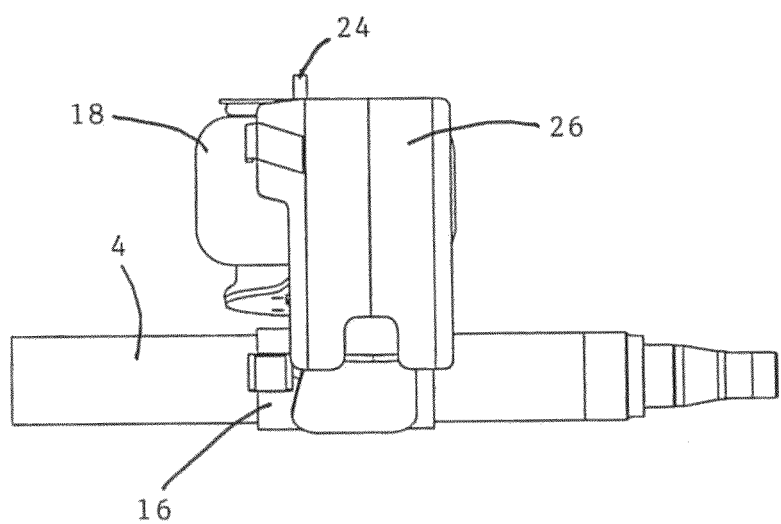
FIG. 7 is an end view of part of the axle suspension system when viewed from a hanger bracket.

In FIG. 6, it can be seen that the beam 8 is angled toward a centre of the axle 4 on a side 44 thereof.

Figure 8:
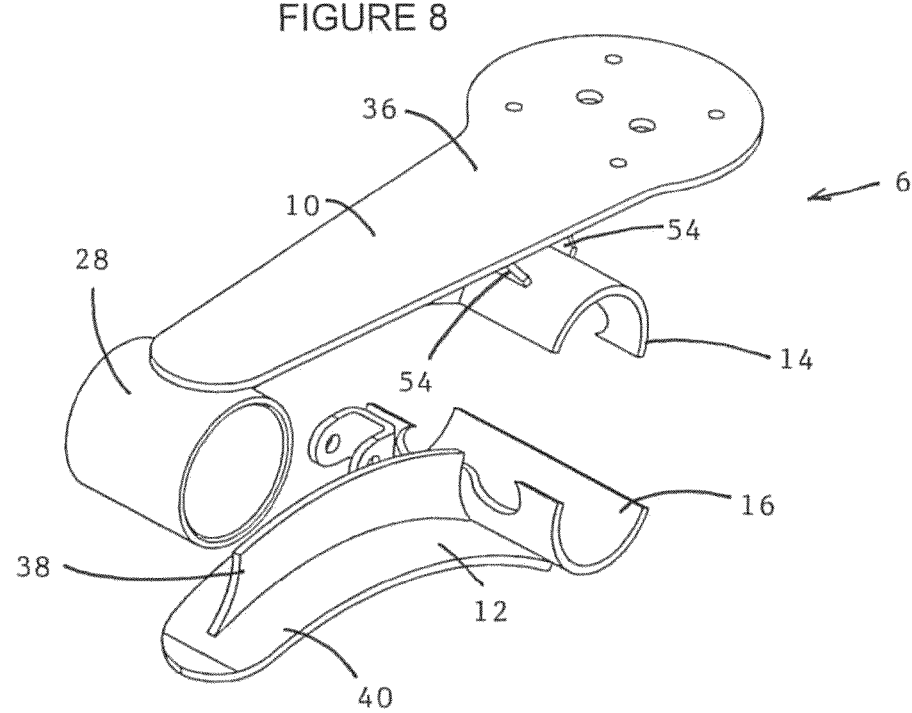
FIG. 8 is an exploded perspective view of a beam.
Figure 9:
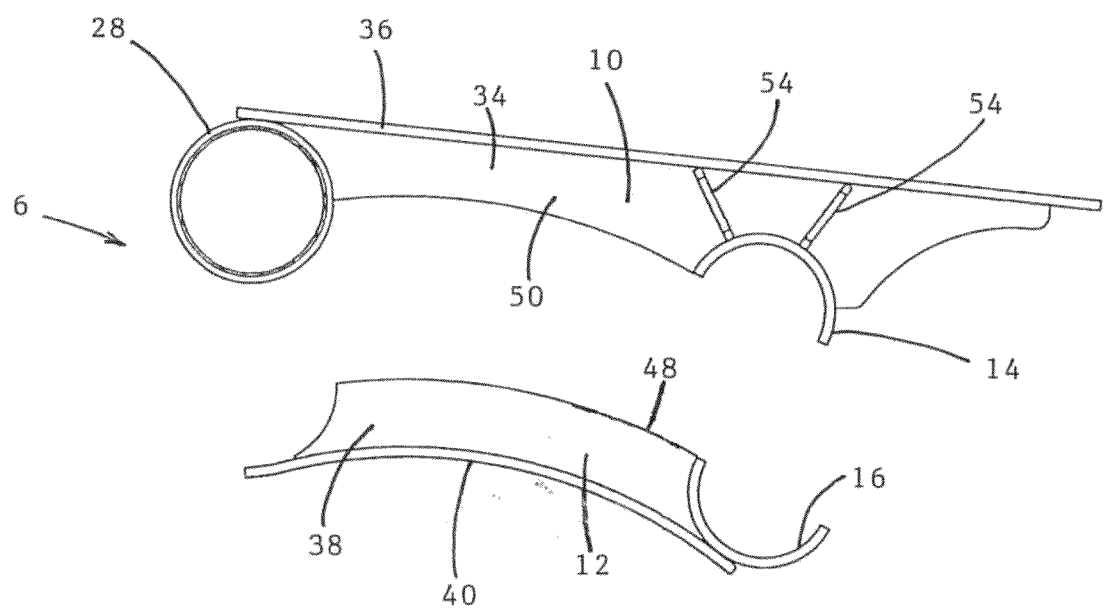
FIG. 9 is an exploded side view of a beam.
Figure 10:
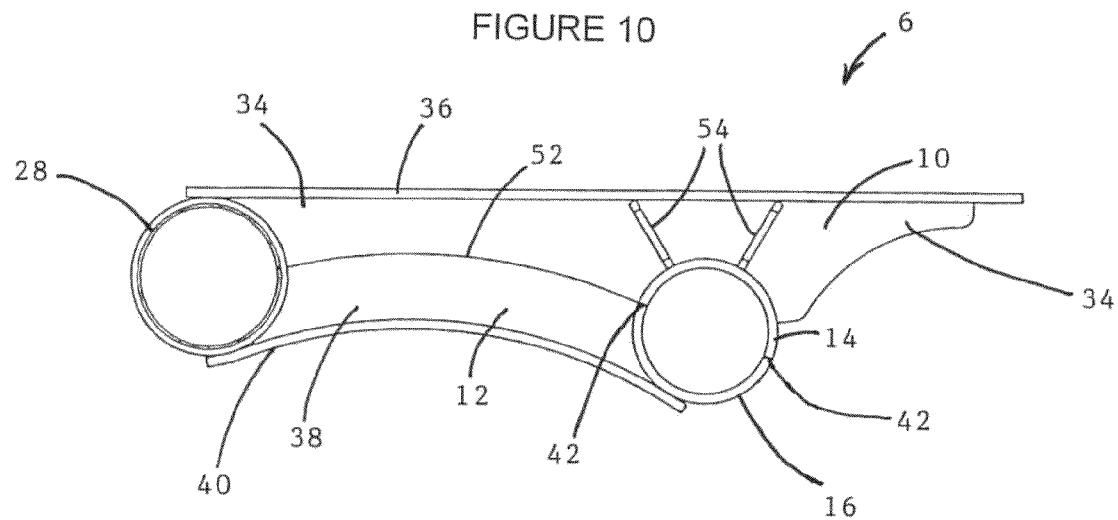
FIG. 10 is a schematic assembled side view of the beam with the axle and hanger bracket being omitted.
Figure 11:
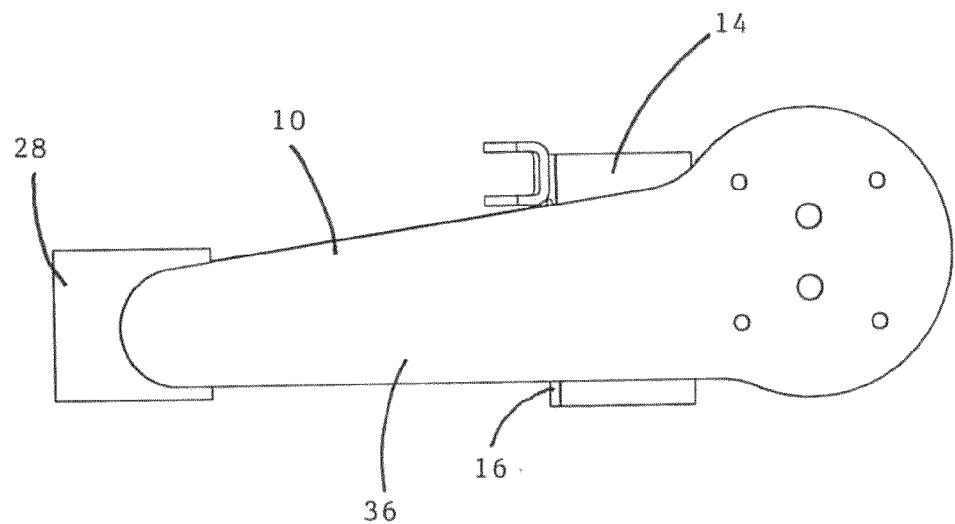
FIG. 11 is a top view of the beam.

In FIGS. 8 to 11, various views of the beam 8 are shown. In FIGS. 8 to 10, it can be seen that the lower section 12 has a convex curve along an upper edge 48 thereof and that the upper section 10 has a concave curve 50 along a lower edge thereof between the cylinder 28 and the attachment portion 14. The convex curve 48 corresponds to the concave curve 50 so that when the lower section 12 and the upper section 10 are in the position that they would be in when installed on the axle (not shown in FIG. 10), the curves 48, 50 form a line of contact 52 and the attachment portion 14 is connected to the web 34 and flange 36 by radial gussets 54. The attachment portions 14, 16 are arc shaped, but can have other cross sectional shapes for connection to the axle. Preferably the attachment portions are shaped to conform to the size of the axle.

Figure 12:
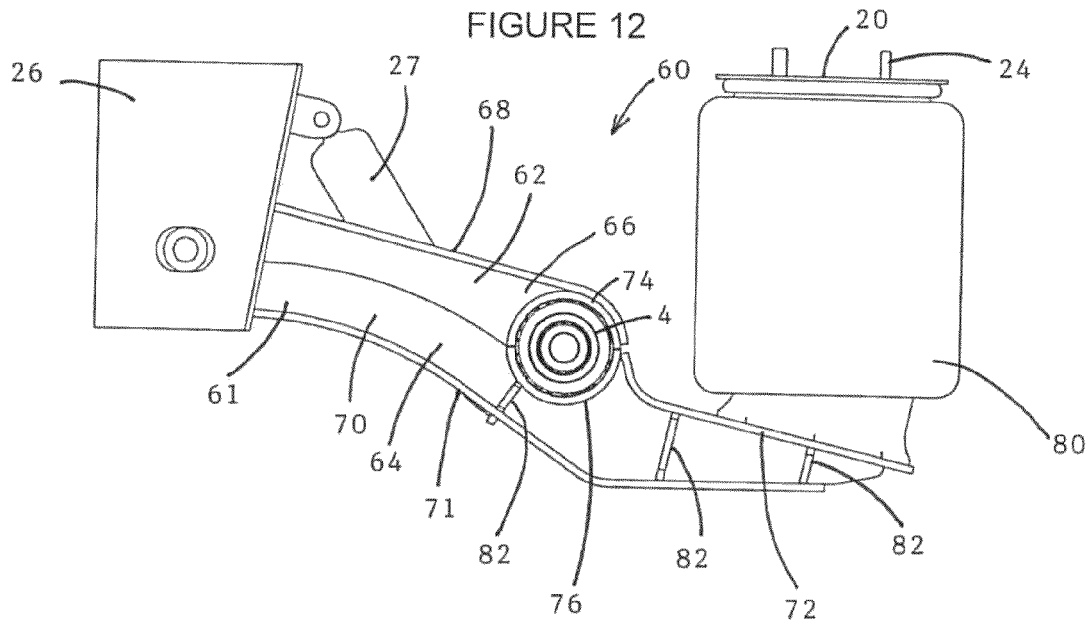
FIG. 12 is a side view of a further embodiment of an axle suspension system.
Figure 13:
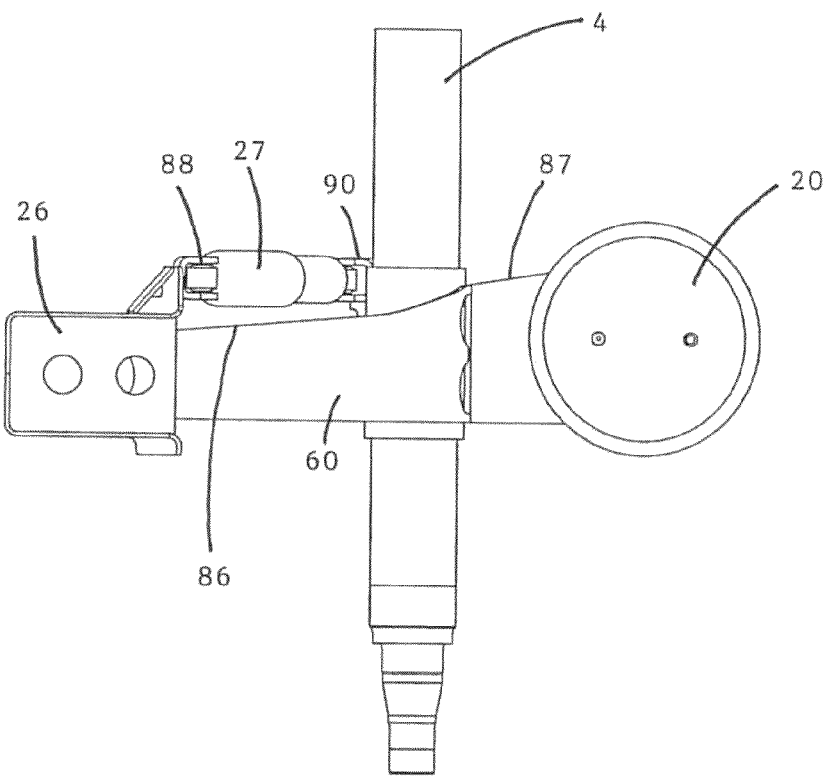
FIG. 13 is a top view of a part of the axle suspension system of FIG. 12.

In FIG. 12, there shown a side view of a further embodiment of a suspension axle. In FIG. 13, there shown a top view and in FIG. 14 there shown a perspective view of part of the embodiment shown in FIG. 12 installed on an axle 4. The suspension system 60 has a beam 61 with an upper section 62 and a lower section 64. The upper section has a web 66 with a flange 68 and the lower section has a web 70 with two flanges 71, 72. The upper section 62 has an attachment portion 74 at an end that is connected to the axle 4. The lower section 64 has an attachment portion 78 that is connected to the axle 4. The lower section 64 extends beyond the axle 4 and the flange 72 is an upper flange that supports a bellows 80. The lower section 64 has gussets 82 on either side of the web 70 (only one side of which is shown). The gussets 82 strengthen the lower section 64. An end of the upper section 62 and an end of the lower section 64 away from the axle 4 are pivotally connected to a hanger bracket 26.

Figure 14:
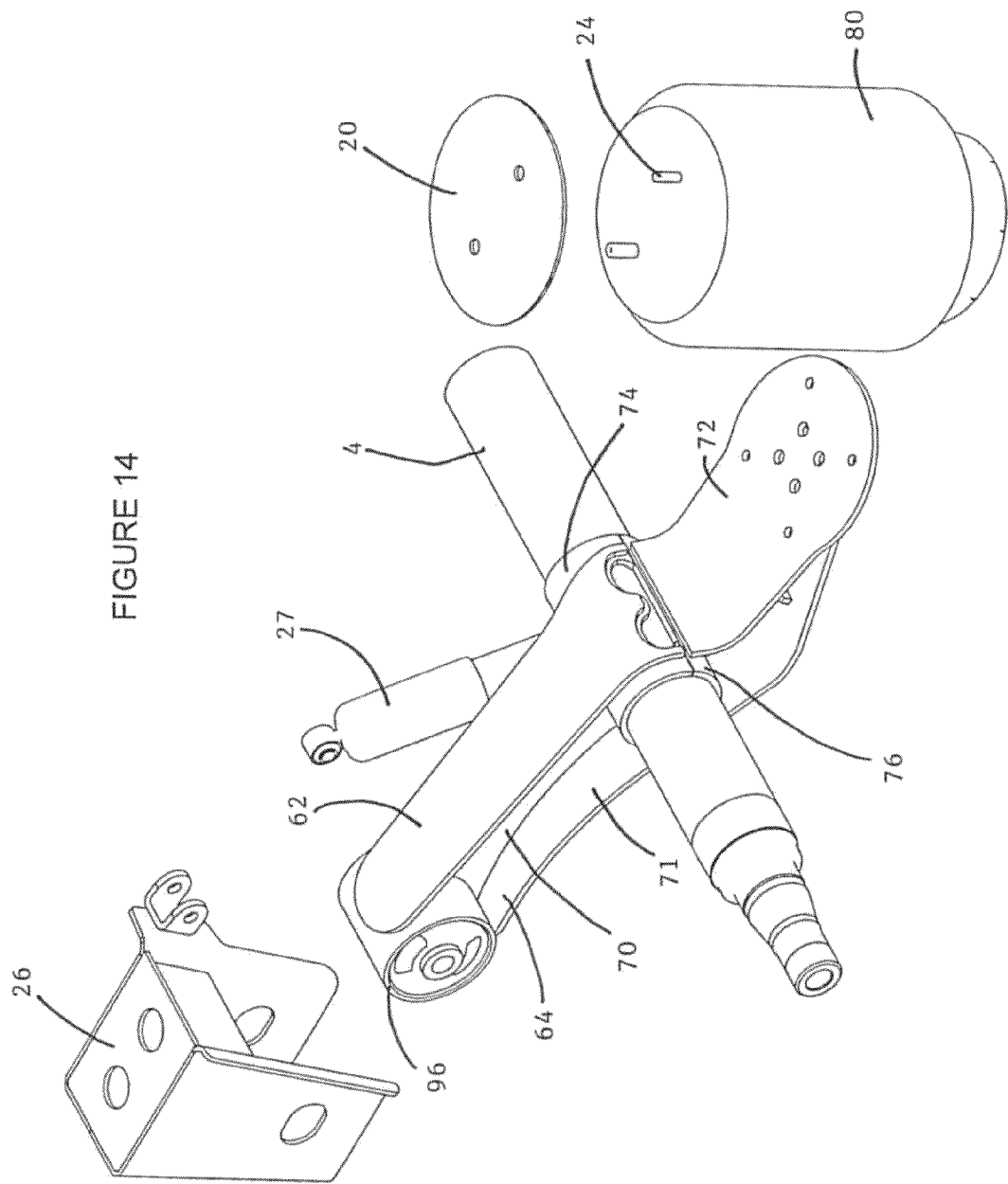
FIG. 14 is a perspective partially assembled and partially exploded perspective view of the axle assembly of FIG. 12.

In the top view shown in FIG. 13, it can be seen that a left hand edge 86 of the flange 68 of the upper section 62 and a left hand edge 87 of the upper flange 72 of the lower section 64 is angled inward so that the flange 72 of the beam 61 can be centered beneath the bellows 80. This configuration eliminates or at least reduces any twisting forces on the beam 61 that would exist if the bellows 80 was not centered on the beam. The U-shaped brackets 88, 90 on the hanger bracket 26 and the attachment portion 74 of the upper section 62 are connected to a pneumatic cylinder (not shown) but to further cushion movement between the frame (not shown) of the vehicle (not shown) and the axle 4. FIG. 14 is a perspective and partially exploded view of part of the suspension system on the axle 4. The suspension 60 has a second beam that is not shown in FIGS. 12 to 16. The second beam is a mirror image of the first beam 61.

Figure 15:
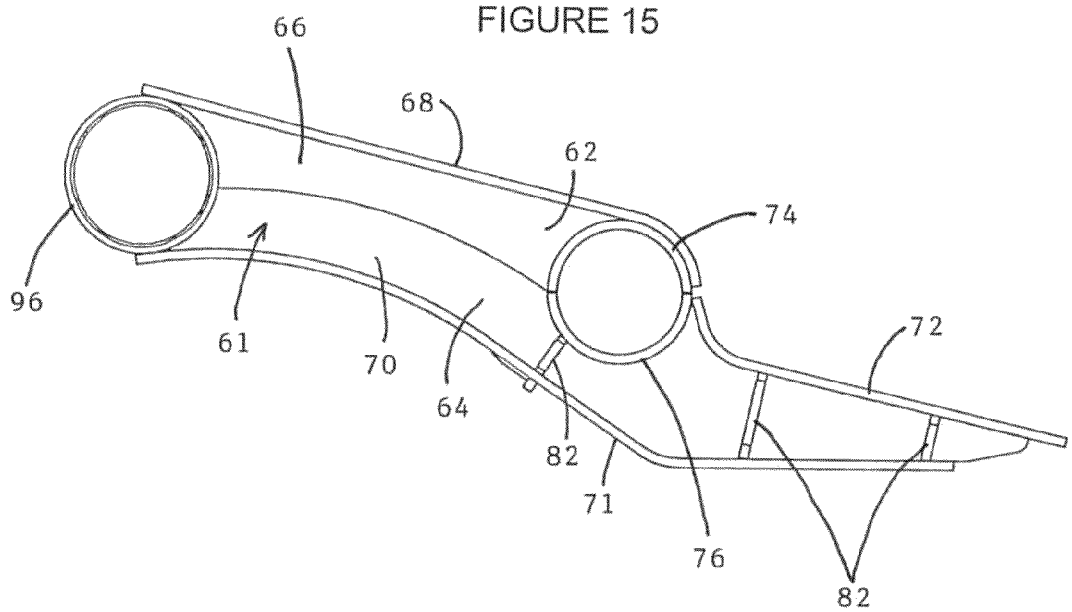
FIG. 15 is a side view of the beam shown in FIG. 12.
Figure 16:
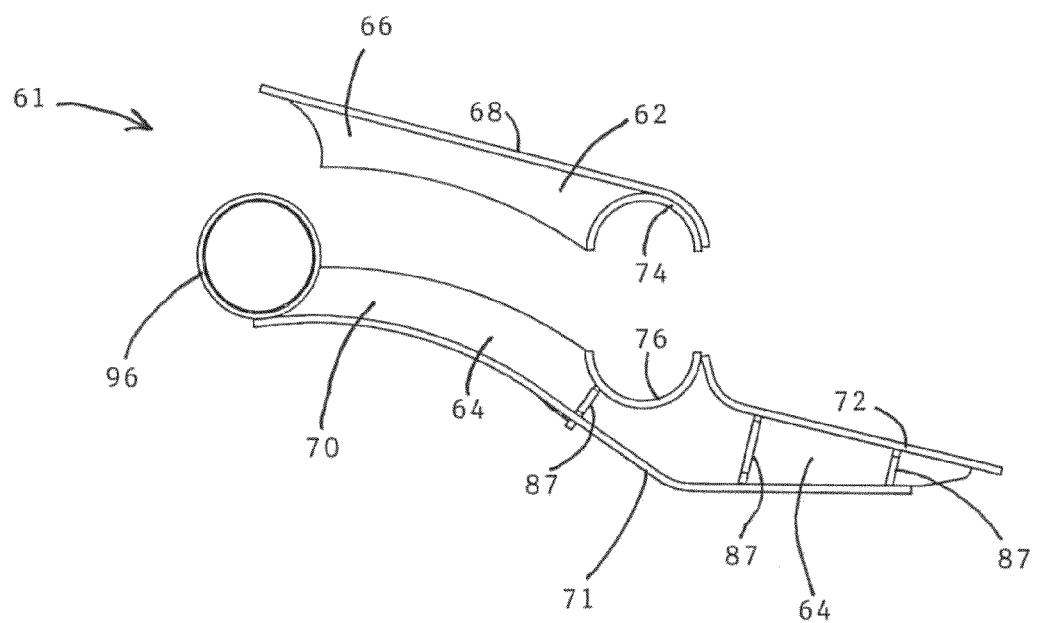
FIG. 16 is an exploded side view of the beam shown in FIG. 12.

In FIGS. 15 and 16, the shape of the upper section 62 and the lower section 64 is clearly shown. A cylindrical connector 96 is connected to the lower section 64 when the upper and lower sections 62 64 are separate and apart from one another.

Figure 17:
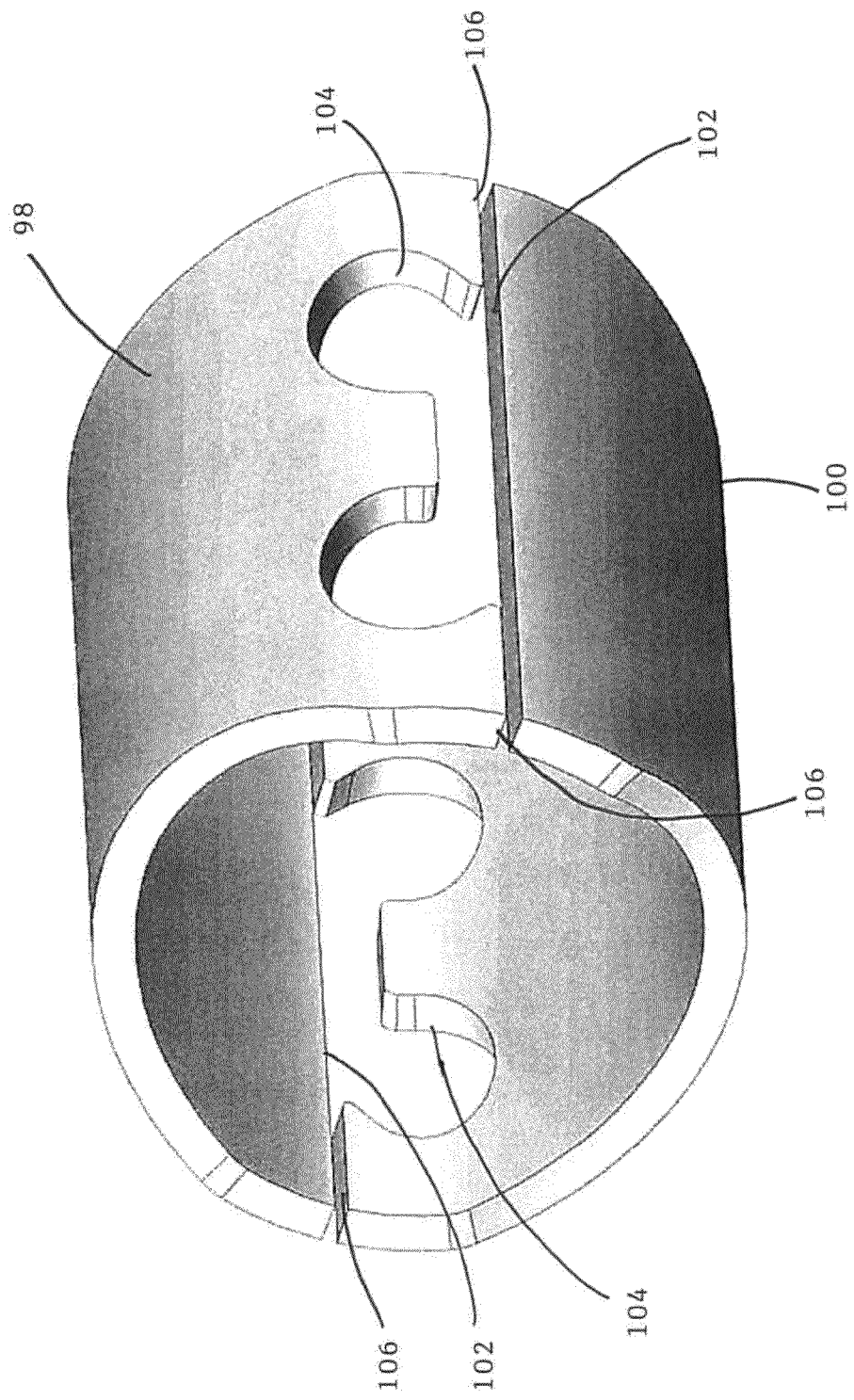
FIG. 17 is an enlarged perspective view of two attachment portions.

In FIG. 17, there is shown two attachment portions that are substantially half cylinders 98, 100. Each of the attachment portions 98, 100 have one straight edge 102 and one uneven edge 104. The uneven edge has a shape similar to the numeral 3 and the two uneven edges 104 are on opposite sides of the two half cylinders so that the uneven edge of one half cylinder 98 is adjacent to the straight edge 102 of the other half cylinder 100 and vice-versa. There are linear edges 106 at either end of the uneven edge 104. The linear edges 106 are welded to that part of the straight edge 102 that is immediately adjacent to the linear edges 106, but are not welded to the axle (not shown in FIG. 17). The remaining length of the straight edge 102 and the uneven edge 104 are welded to the axle (not shown in FIG. 17).

The cross sectional shape of the axle will usually be circular, but other cross sectional shapes will be suitable including, rectangular, square and oval. Also, the axle will usually be hollow, but axles can also be solid.

We claim:

1. An axle bearing beam suspension system for an axle of a wheeled vehicle, the suspension system comprising a pair of elongated beams, one of the beams being located adjacent to each side of the vehicle, the beams being spaced from one another, the axle extending across an entire width of the vehicle, the axle having at least one wheel located on each end thereof, a pneumatic bellows located en each of the beams, a hanger bracket located at one end of each beam for connecting the axle to a frame of the vehicle, an opposite end of each beam being connected to the axle, each beam being formed from an upper section and lower section, each section having one end that is connected directly or indirectly to the hanger bracket and an attachment portion at an end that is connected to the axle, the attachment portion having a shape that corresponds to part of an outer surface of the axle, the attachment portion on the lower section being welded to a lower part of the axle and the attachment portion on the upper section being welded to an upper part of the axle immediately above the lower section, the two attachment portions of the upper and lower sections of each beam being substantially the same as one another, the upper section having a surface to support the bellows, the upper and lower sections each having T-shaped cross sections, a bottom edge of the upper section having a shape that is a mirror image of an upper edge of the lower section such that the upper and lower edges of each section are curved form a line of contact with one another for some distance when the sections are installed on the axle.

2. An axle bearing suspension system is claimed in claim 1 wherein each section has a web with a centrally located flange extending perpendicularly thereto, the web and flange on the upper section being connected to the attachment portion though a plurality at gussets extending radially from the attachment portion to the web and flange.

3. An axle bearing suspension system as claimed in claim 2 wherein the web on the lower section is connected to the attachment portion radially and the flange is connected to the attachment portion tangentially.

4. An axle bearing suspension system as claimed in claim 3 wherein the web of each section is connected to the attachment portion along an arc shaped line of contact.

5. An axle bearing suspension system as claimed in claim 2 wherein the beams are pivotally connected to the hanger bracket.

6. An axle bearing suspension system as claimed in claim 1 wherein the attachment portions are substantially two half cylinders when the axle has a circular cross section.

7. An axle bearing suspension system as claimed in claim 6 wherein each haft cylinder has one uneven edge and one straight edge, the uneven edge having a shape similar to a numeral 3 through part of its length, the uneven edges being on opposite sides of the two half cylinders so that the uneven edge of one half cylinder is adjacent to the straight edge of the other half cylinder.

8. An axle bearing suspension system as claimed in claim 7 wherein the half cylinders are welded to the axle along the uneven edge and along that portion of the straight edge that is adjacent to the uneven edge, the half cylinders each having a linear edge extending on either side of the uneven edge the two linear edges being welded to that portion of the straight edge of the other half cylinder that is adjacent to the linear edges, but not being welded to the axle.

9. An axle bearing suspension system as claimed in claim 7 wherein the straight edge of the upper section is located on the bellows side of the axle, the upper section having a web overlying the half cylinder, the web being cut away in a corresponding shape to the uneven edge of the upper section to allow access to the uneven edge of the upper section for welding.

10. An axle bearing beam suspension system for an axle of a wheeled vehicle, the suspension system comprising a pair of elongated beams, one of the beams being located adjacent to each side of the vehicle, the beams being spaced from one another, the axle extending across an entire width of the vehicle, the axle having at least one wheel located on each end thereof, a pneumatic located on each of the beams, a hanger bracket located on one end of each beam for connecting each beam to a frame of the vehicle, each beam having an upper section and a lower section, the upper and lower sections each having a T-shaped cross section, the lower section being inverted relative to the upper section, the upper and lower section having a corresponding shape to one another to fit together along a curved line of contact to form an I-beam when the two sections are installed on an axle, each section having an attachment portion at an end that is to be affixed to the axle, the attachment portions corresponding to the cross sectional shape of the axle and being sized to be affixed around the axle with the lower section being substantially on a bottom half of the axle and the upper section being substantially on an upper half of the axle.

11. An axle bearing beam suspension system for an axle of a wheeled vehicle, the suspension system comprising a pair of elongated beams, one of the beams being located adjacent to each side of the vehicle, the beams being spaced from one another, the axle extending across an entire width of the vehicle, the axle having at least one wheel located on each and thereof, a pneumatic bellows located on each of the beams, a hanger bracket located on one end of each beam for connecting each beam to a frame of the vehicle, each beam having an elongated upper section and an elongated lower section, the upper and lower sections each having a T-shaped cross section with the lower section being inverted relative to the upper section to form the beam along a line of contact with an I-shaped cross section when the two sections are installed on the axle, the upper section having a lower edge corresponding in shape to an upper edge of the lower section so that the two edges are in contact with one another for some distance when the sections are installed on the axle, the upper and lower edges being curved.

12. An axle bearing suspension system as claimed in any one of claim 1, 10 or 11 wherein the upper section has a smoothly curving lower edge that is lower at each end and higher at a centre and the lower section having a smoothly curving upper edge corresponding to the lower edge, the lower section having a lower surface that is smoothly curving to correspond to the upper edge.

13. An axle bearing suspension system as claimed in any one of claim 1, 10 or 11 wherein the elongated beams each angle inward from the hanger bracket to the axle so that the flange on the upper section on a side of the axle opposite to the hanger frame is centered under the bellows, the bellows being an air spring.

14. A method of fabricating an axle bearing beam suspension system for an axle of a wheeled vehicle, the suspension system having a parallel elongated beams that are spaced from one another, the axle extending across an entire width of the vehicle, the axle having at least one wheel located on each end thereof, pneumatic bellows located on each of the beams, a hanger bracket located on one end of each beam where connecting the axle to a frame of a vehicle, the method comprising constructing a lower section of the beam and an upper section of the beam separately with each section having a T-shaped cross section, the T-shaped cross section being a web that is centrally and perpendicularly mounted on a flange, constructing the flange of the upper section to curve downward at each end, constructing the flange of the lower section to correspond to the flange of the upper section and also to have a web, the flange of the upper section and the flange of the lower section forming a line of contact with one another when the upper and lower sections are brought together to form the beam, each section having a bracket at one end to directly or indirectly connect the two sections to the homer bracket, an opposite end of each section having an attachment portion for attaching the sections to the axle, and welding the attachment portions to the axle, one above the other, forming the attachment portions for each beam to have a shape of substantially two half cylinders when the axle has a circular cross section, shaping each of the half cylinders to have one uneven edge and one straight edge.

15. A method as claimed in claim 14 including the steps of locating a linear edge on either side of the uneven edge of each half cylinder and welding the linear edges to that portion of the straight edge of the other half cylinder that is adjacent to the linear edges but not welded to the axle and welding to the axle that portion of the uneven edge having the shape of the numeral 3 at that portion of the straight edge that is adjacent to the uneven edge.

* * * * *